United States Patent
d'Hont

[11] Patent Number: 5,619,207
[45] Date of Patent: Apr. 8, 1997

[54] HIGHLY ACCURATE RE-ID POSITIONING SYSTEM

[75] Inventor: Loek d'Hont, Almelo, Netherlands

[73] Assignee: Texas Instruments Incorporated, Dallas, Tex.

[21] Appl. No.: 659,753

[22] Filed: Jun. 6, 1996

Related U.S. Application Data

[63] Continuation of Ser. No. 141,444, Oct. 22, 1993, abandoned.

[51] Int. Cl.$^6$ .................................................. G01S 13/74
[52] U.S. Cl. ............................. 342/42; 342/44; 342/50
[58] Field of Search ............................ 342/42, 44, 50, 342/51

[56] References Cited

FOREIGN PATENT DOCUMENTS

| | | |
|---|---|---|
| 0257688 | of 0000 | European Pat. Off. . |
| 0186483 | of 0000 | European Pat. Off. . |
| 3135543 | of 0000 | Germany . |
| 2133660 | of 0000 | United Kingdom . |
| 2075301 | of 0000 | United Kingdom . |
| WO-A-8200378 | of 0000 | WIPO . |

*Primary Examiner*—J. Woodrow Eldred
*Attorney, Agent, or Firm*—Rebecca A. Mapstone; James C. Kesterson; Richard L. Donaldson

[57] ABSTRACT

A balanced receive antenna circuit configuration determines an accurate position of a transponder within the antenna field pattern of the reader antenna. The balanced receive antenna configuration consists of two antennas physically rotated 90 degrees relative to one another, disposed concentrically on top of one another. Furthermore, each receive antenna consists of two coils located a predetermined distance apart. The optimum distance separating the coils is determined by trading off zero position detection with the transponder detection range. The transmitter antenna surrounds the receiver coilset. In operation, initially the transmitter antenna sends a power burst signal for a predetermined duration to charge up the transponder to the maximum charge possible. Then for a very brief duration, the transmitter antenna is damped to permit the receive antennas to better receive the transponder response telegram. Then simultaneously, one receive antenna receives the 'X' position component and the other receiver antenna receives the 'Y' position component in the form of voltages. Depending upon which quadrant of the antenna pattern the transponder is disposed, the sign and value of the X component and the Y component of voltage is detected. These voltages are then narrow band filtered around a center frequency and gated for a small portion of the length of the entire response telegram, and those outputs are combined in a signal processor which outputs the exact position data information.

11 Claims, 3 Drawing Sheets

HIGHLY ACCURATE RE-ID POSITIONING SYSTEM

This application is a Continuation of application Ser. No. 08/141,444, filed Oct. 22, 1993 abandoned.

FIELD OF THE INVENTION

This invention generally relates to positioning with RE-ID systems.

BACKGROUND OF THE INVENTION

In a standard Radio Frequency-Identification (RE-ID) system, an interrogating antenna, sometimes called the transmitter antenna, transmits a power burst signal of some predetermined duration to power up the passive transponder in the field to respond. Once the transponder is fully charged from the interrogation signal, the power burst signal is damped at the interrogator, and the transponder transmits it response telegram. The response telegram generally consists of identification information and/or sensor or other data and is received by the interrogator. If a response telegram is received, then the interrogator knows that the transponder lies within the read range of the interrogation antenna. However, generally, with standard RE-ID interrogation equipment, it is not possible to determine the exact physical position of a transponder within the read range of the antenna due to the many variables involved. Some other the relevant variables are the distance between the reader and antenna, interrogation antenna size, interrogation field strength, orientation of the transponder with respect to the antenna and ambient noise levels.

With enough transponders located across an area, the approximate location of a particular object associated with a particular transponder may be achieved, but this solution will also probably be cost-prohibitive.

SUMMARY OF THE INVENTION

A balanced receive antenna circuit configuration determines an accurate position of a transponder within the antenna field pattern of the reader antenna. The balanced receive antenna configuration consists of two antennas physically rotated 90 degrees relative to one another, disposed concentrically on top of one another. Furthermore, each receive antenna consists of two coils located a predetermined distance apart. The optimumdistance separating the coils is determined by trading off zero position detection with the transponder detection range. The transmitter antenna surrounds the receiver coilset. In operation, initially the transmitter antenna sends a power burst signal for a predetermined duration to charge up the transponder to the maximum charge possible. Then for a very brief duration, the transmitter antenna is damped to permit the receive antennas to better receive the transponder response telegram. Then simultaneously, one receive antenna receives the 'X' position component and the other receiver antenna receives the 'Y' position component in the form of voltages. Depending upon which quadrant of the antenna pattern the transponder is disposed, the sign and value of the X component and the Y component of voltage is detected. These voltages are then narrow band filtered around a center frequency and gated for a small portion of the length of the entire response telegram, and those outputs are combined in a signal processor which outputs the exact position data information.

One advantage of this invention is that a minimal number of additional components are required, most of which may be incorporated into an existing IC.

A second advantage of this system is that the balanced nature of the receiver antennas creates inherent noise resiliency for the system.

BRIEF DESCRIPTION OF THE DRAWINGS

The invention will be explained in greater detail with reference to an example of an embodiment shown in the drawings, in which.

DETAILED DESCRIPTION OF PREFERRED EMBODIMENTS

Figure 1:
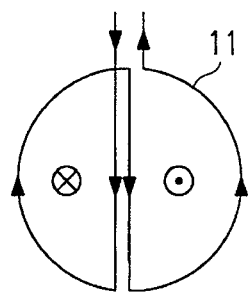
FIG. 1 shows a detail of the configuration of a single receive (RX) antenna according to a preferred embodiment of this invention.
Figure 3:
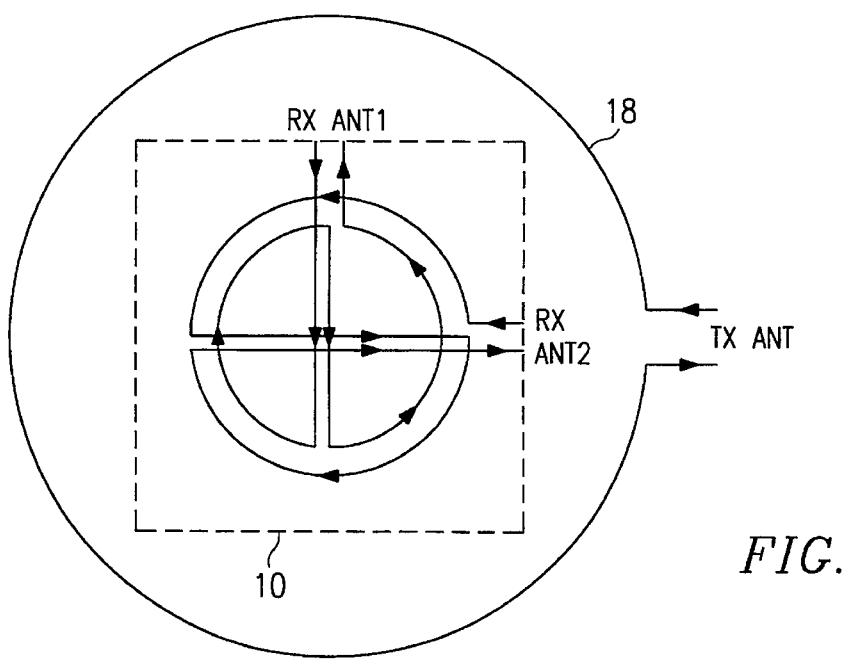
FIG. 3 shows a configuration of the two receive antennas, rotated 90 degrees relative to each other, and the transmit antenna according to a preferred embodiment of this invention.
Figure 4:
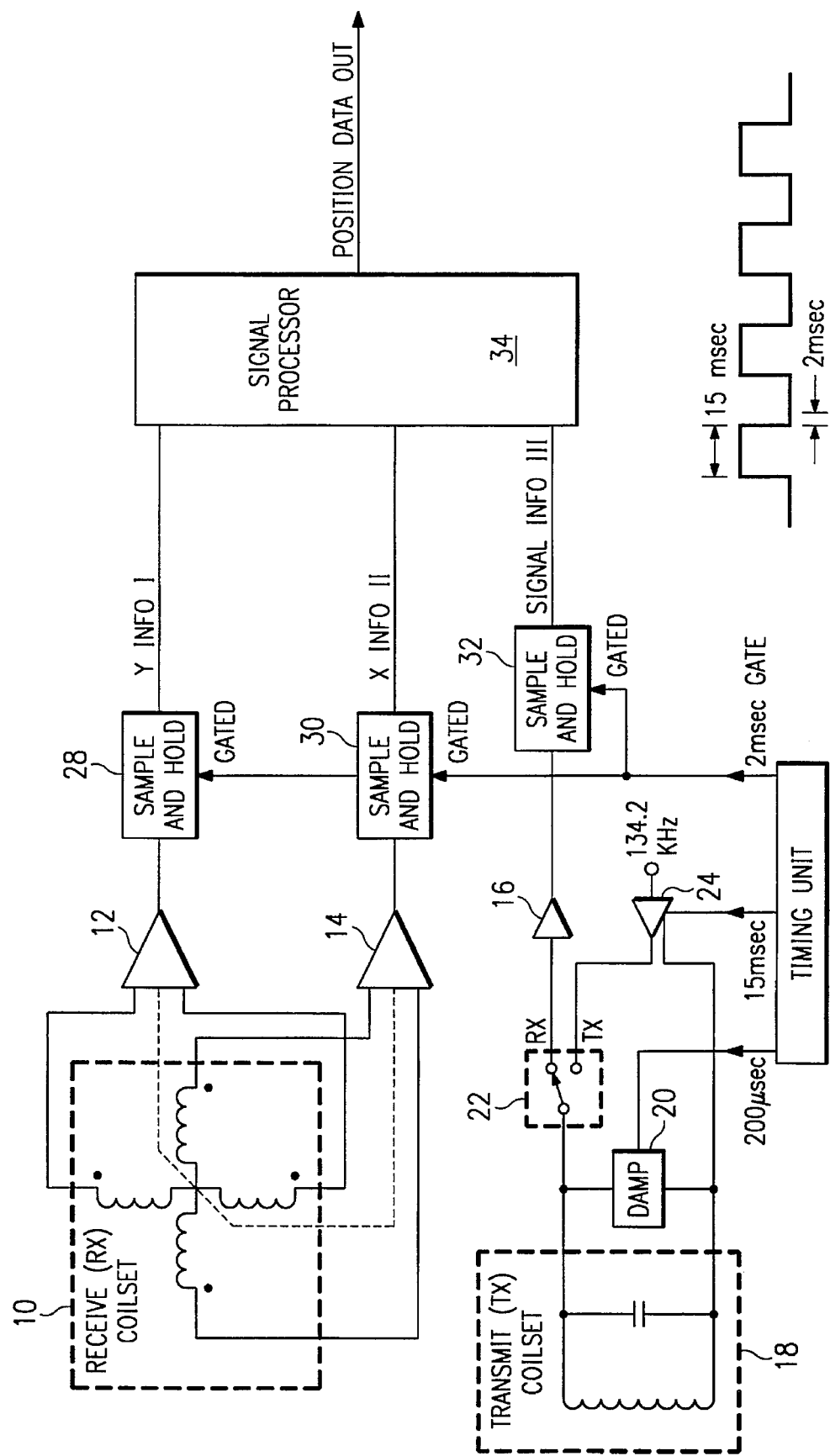
FIG. 4 shows a schematic of the circuit which generates the position data according to a preferred embodiment of this invention.
Figure 5:
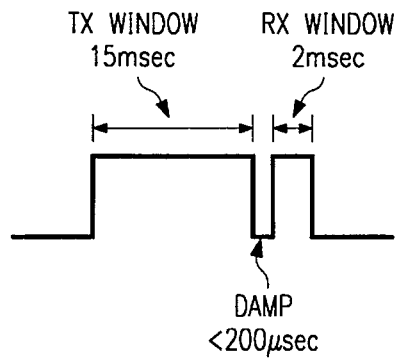
FIG. 5 is a timing diagram showing the transmit window, the damping window and the receive window.
Figure 7:
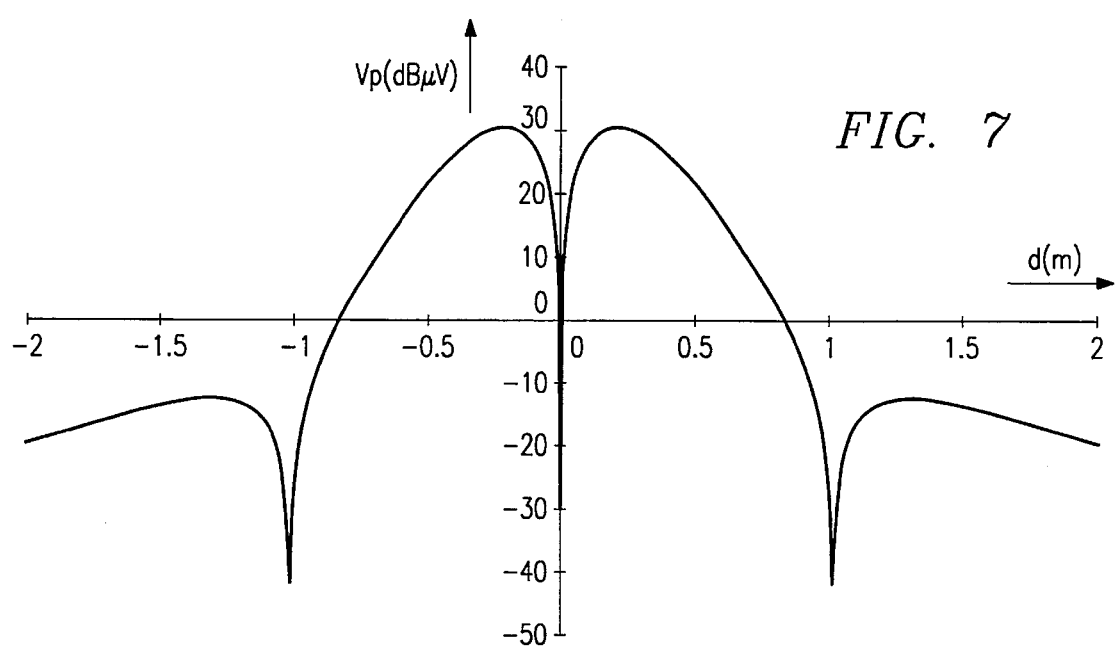
FIG. 7 shows the amount of voltage induced in the entire antenna of FIG. 1, as the antenna is moved from one side of the transponder to the other.

A preferred embodiment of the invention is shown in FIGS. 1 and 3. In FIG. 1, a practical version of the actual physical layout of a preferred embodiment of a receiver coil configuration is given, together with current, field and winding orientations. The receiver coilset is comprised of two sets of receiver coil configurations; a first one for determining the "X" coordinate and a second, shifted 90 degrees in amplitude from the first, for determining the "Y" coordinate, as shown in FIG. 3. If the application requires only linear positioning, i.e. only the "X" dimension, one set of receiver coils, one receiver and one sample and hold circuit, as shown in FIG. 5, can be left out. Each receiver antenna configuration uses a special coil arrangement of a series configuration of two coils disposed a predetermined distance from each other for receiving the transponder telegram, as schematically shown in FIG. 1. The distance between the coils plays an important role in defining the characteristic of the antenna. If the distance between the coils is small, as shown in FIG. 1, the notch characteristic in the voltage induced at the receive antenna, created when the antenna passes directly over the transponder, is deep as shown in FIG. 7. This desirable characteristic is contrasted with the undesirable characteristic of a smaller field sensitivity pattern of the transponder. Therefore, the distance between the coils is a technical trade-off between defining the zero position accurately and exactly, and creating a larger region within which the transponder may be detected. In addition to the requirement of a predetermined distance between the coils, one coil orientation is reversed compared to the other and the coil area of both coils is identical. The area of both coils must be identical to ensure equal induced voltages, and thus a sharp notch in the antenna signal when the coils are positioned exactly above the transponder, as the voltages from each coil will cancel each other out. Because when the receive antenna coilset is directly over the transponder, the sum field strength voltages is zero volts, the antenna configuration shown in FIG. 1 is also called a balanced antenna configuration. Balanced antenna configurations offer many advantages over standard antenna configurations such as inherent noise canceling and a sharp notch characteristic in the induced antenna voltage when the antenna passes directly over the transponder.

This particular configuration of the receive antennas generates a specific field that is necessary in this application; the receive antennas exhibit a quadrature field sensitivity pattern, which yields X and Y measurements. In other words, if the transponder lies in the first quadrant, both the X receive antenna and the Y receive antenna will detect a positive field strength voltage value. Similarly, if the transponder lies in the second quadrant, the X receive antenna will detect a positive fieldstrength voltage value and the Y receive antenna will detect a negative fieldstrength voltage value; And so on.

Figure 2:
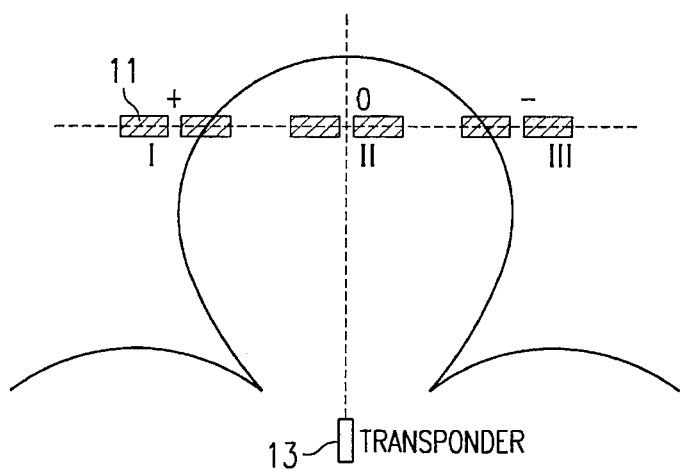
FIG. 2 shows a transponder field pattern and the detection or absence thereof of the transponder as the antenna of FIG. 1 is moved through that field pattern.

In FIG. 2, a side view of the transponder and the balanced antenna of FIG. 1, is shown wherein the balanced antenna is oriented in a horizontal plane along the dotted line drawn with both portions of the antenna going into and coming out of the page, but with the right portion of the antenna closer to the transponder than the left portion. In addition, the field lines drawn are the transponder field lines within which the transponder can be detected. FIG. 2 illustrates snapshots in time of the sum voltages detected by the antenna of FIG. 1 as the antenna is moved along the dotted line drawn. As the antenna of FIG. 1, is moved along the dotted line drawn, the reader will either detect a positive or negative fieldstrength voltage or a zero fieldstrength voltage from the transponder as shown.

In position I, the right portion of the antenna shown in FIG. 1 will induce more voltage than the left portion. The sum voltage of the balanced arrangement, i.e. the right and left portions of the antenna, will be positive, which means the antenna arrangement is disposed at the left side of the transponder. In position II, the antenna arrangement is positioned exactly above the transponder. A sum voltage of zero volts indicates that the center of the antenna field pattern is reached. This zero reference is used in determining the absolute location of the transponder. The region around the (0,0) reference, where the sum voltage will be zero volts, is very narrow as shown by the steep notch at (0,0) in FIG. 7. This characteristic yields more accurate determined locations, as the location determination is dependent upon referencing from the center of the quadrants or a (0,0) reference. The actual signal-to-noise ratio at the receiving antenna terminals will determine the final accuracy. Finally, in position III, the sum voltage of the fieldstrengths detected is negative indicating that the antenna arrangement is located on the right side of the transponder.

Even more precise, FIG. 7 gives a point by point induced voltage measurement, represented as a line, as detected by the antenna of FIG. 1 as the antenna is moved across the field pattern of the transponder in the same manner as shown in FIG. 2.

In FIG. 3, a preferred embodiment of the invention of a combination of two receive antennas rotated 90 degrees relative to one another is shown, for X and Y coordinate detection. With this particular antenna configuration, the transponder can be approached, detected and located from any side, or in any orientation with respect to the antenna. This result can be somewhat shown in FIG. 2 by overlaying the same transponder antenna pattern shown, rotated by 90 degrees, on top of the existing antenna pattern, creating a much larger response area.

The large antenna around the receive antenna arrangement is the transmit or charge-up (power burst) antenna for energizing the transponder. The transmit antenna is large relative to the receive antenna size because it is important to make sure that the transmitter can create a strong enough fieldstrength signal to charge the transponder to the maximum amount of voltage that can be stored in the transponder, i.e 7 volts. In this way, the transponder telegram will be transmitted with a known fieldstrength. However, in a preferred embodiment of the invention, knowledge of the transponder telegram fieldstrength is not necessary because the receive antenna arrangement is balanced, such that each measurement received will be determined from the same reference point. Thus, if the transponder telegram is a small fieldstrength, because each of the receive antennas are balanced, each half of each receive antenna will detect a smaller relative fieldstrength measurement than would have been detected had the transponder telegram fieldstrength been higher. However, with a better known fieldstrength from the transponder, determining the transponder location with just one readout cycle, i.e. the interrogator interrogates, the transponder responds, and the interrogator receives the transponder telegram, plus additional calculations on the absolute signal levels coming from the receive antennas, is possible.

The charge-up antenna is also large to offset the relatively low Q nature of the antenna while still yielding sufficient fieldstrength to adequately charge the transponder to it's maximum charge voltage. The Q needs to be as low as possible to make sure the energy from this antenna is damped sufficiently within about 500 usec, measured at the receiving antennas, such that the receive antennas are able to detect the transponder telegram, which has much less energy than the interrogation signal. However, if the receiver coil antenna arrangements are centered exactly within the transmitting coil, as shown in FIG. 3, the balanced nature of the receiving coils helps to cancel out the induced voltage in the receiver antennas caused by the transmitter antenna while the transmitter is transmitting the interrogation signal. In this way, the previously mentioned damping requirements required of the transmitter antenna are not as difficult to achieve.

FIG. 5 shows an electrical schematic of the circuits which process the receive and transmit antenna signals and yield the position of the transponder 13. Detail 10 of FIG. 5, shows the 90 degree rotation which exists between the two receiver coil arrangements. Each coilset 11, one for measuring the X position and one for measuring the Y position, has it's own narrow band receiver 12,14. The receivers 12,14 narrow band filter the received fieldstrength voltages to approximately a 3 Khz bandwidth, centered around 134.2 Khz. The 3 Khz receiver bandwidth is much narrower than most standard receivers and therefore much more robust to noise, which is further enhanced by the balanced nature of the receiver coil arrangements 10, 11. The 3 Khz bandwidth allows for a 1.2 KHz maximum drift from the 134.2 KHz reference plus an additional 600 Hz which is the minimum bandwidth required for the step response of the filter to reach the required signal level without distorting the signal. The sample and hold (S & H) circuits 28, 30, 32 are gated via timing circuit 26, or open for a specific time, i.e. 2.2 msec, and disregard the initial 0.2 msec of input from the receivers, during which time the DAMP circuit of FIG. 5 is damping the transmitter antenna 18. With the 3 KHz receiver bandwidth centered around 134.2 Khz and the S & H circuits gated, the receivers 12, 14, 16 will only be sensitive to the low-bit frequency of the transponder, the 134.2 Khz +/−500 Hz signal coming from the transponder in the first 2 millisec (ms) subsequent to the end of the power burst from the transmitter.

The initial part of the transponder signal is normally formed by the first 16 bits (run-in bits), low-bit, 134.2 Khz frequency signal, from the telegram and is the same for every transponder, independent of the transponder type or Identification (ID) code associated with a particular transponder. A second advantage of using the first run-in bits of the transponder telegram for the detection of the location of the transponder, is that the fieldstrength of the first run-in bits of the transponder telegram is independent of the charge capacitor voltage value of the transponder. This is true, although there may be great variations in capacitance values due to tolerances, because the detrimental effect due to a higher or lower value of capacitance is a drop off in the signal strength of the response telegram, and the drop off effect is most pronounced at the end of the telegram. Therefore, use of the first run-in bits avoids the potential drop-off problem.

The received fieldstrength is mainly determined by whether the 7 volt Vcl limiter was reached during transponder charge-up, which is a system requirement to achieve reliable and highly accurate positions. Theoretically, it would have been possible to use 600 Hz bandwidth gated receivers, which would still allow a narrow-band filter step-response rise time of 5-tau within 1.3 msec, which is enough because the duration of the run-in bits is 2 msec. However, due to variations in the transponder resonance frequency due to ageing, temperature and many other factors, using 3 Khz bandwidth receivers creates a more reliable result.

The filtered output of the receivers is fed into the sample-and-hold (S/H) circuits, H, I, from which the data is fed into a signal processor. A conventional processor would "AND" the three signals in the proper manner to yield the position information; a more complex and specialized processor would do an A to D conversion on all 3 signals and calculate the position of the transponder at any given moment, even when the signals from the detectors are not zero.

Figure 6:
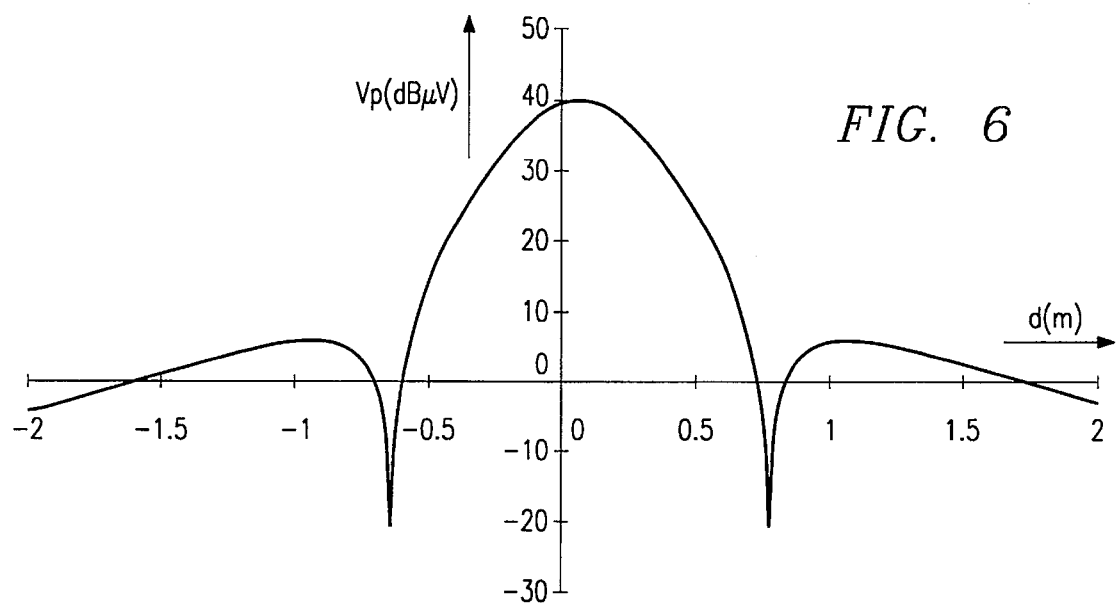
FIG. 6 shows the amount of voltage induced in one half of the antenna shown in FIG. 1, as the antenna is moved from one side of the transponder to the other.

FIG. 6 is a timing diagram which shows the gate timing; 15 msec for the transponder charge-up interval, which can be shorter or longer depending upon the transponder type and distance from the transponder to the antenna, a damp timing of, for example, 200 usec, and the transponder fieldstrength receive interval of approximately 1.5 msec.

If no transponder lies within the read range of an antenna or the transponder is positioned right below the receiver antenna configuration, a zero volts measurement is detected by the receiver coils as shown in FIG. 7. To distinguish between the two aforementioned situations when a zero volts measurement is detected, in a preferred embodiment of the invention, the charge-up or transmitter antenna is also used as a receive antenna which is also connected to a narrow-band receiver, 16, as shown in FIG. 5. Therefore, when the transponder is positioned substantially below the receiver antenna coils, the transmitter antenna will detect the presence of the transponder, despite the zero-volt measurement detected by the receiver coils, as the transmitter antenna will be located within the transponders strongest energy field. Alternatively, if the transmitter antenna/receiver detects no signal from a transponder, no transponder exists within the read range of the antenna.

In another preferred embodiment of the invention, an even more simple method to solve the false zero-output problem is to only use the fieldstrength measurement of only one half of the antenna of FIG. 1, the results of which are shown in FIG. 6. Unlike the large notch characteristic that exists at coordinates (0,0) of FIG. 7, which shows the voltage induced as a result of the entire balanced antenna of FIG. 1, FIG. 6 shows it's highest peak response at coordinates (0,0). In this case, the transmitter antenna would not also have to operate as a receiver as previously described and as shown in FIG. 5.

In yet another preferred embodiment of the invention, another way to distinguish between the two situations is to detect whether a valid ID code is actually returned from the transponder, using a standard interrogator on the large antenna. In this way, the interrogator will receive a valid ID code from the transponder if a transponder exists and will receive nothing if a transponder does not exist.

Yet a third method of distinguishing between the two situations is at the processing computer in combination with a vehicle motion detector. Once a transponder grid is established, the vehicle motion detector can detect how much displacement has occurred in the vehicle while it is moving, and the processing computer will know whether or not a transponder should be located at that position or not. In this way, a transponder presence or absence can be established.

A final method of distinguishing between the situations would be to use center taps, as shown by the dotted lines drawn from the center of the antenna configuration to each of the receivers of FIG. 5, to yield phase information from the fieldstrength voltage measurements. The phase reference will allow detection of the transponder even when zero volts is detected.

With reference to FIG. 5, operation of the system is described. Initially, switch 22 is closed to transmit, and a 134.2 KHz power-burst signal is amplified via amplifier 24 and transmitted via resonant circuit 18, for 15 msec via timing circuit 26, to charge up the transponder 13 to it's maximum charge voltage, Vcl. At the end of the power burst signal, DAMP circuit 20 damps the resonant circuit 18 for 200 μsec, to reduce the energy of the decaying oscillations further. Also at the end of the power burst, the transponder 13 transmits a response telegram. Receiver coilsets 10 receive the response telegram, and the induced voltages are band filtered around a center frequency of 134.2 KHz via receivers 12, 14. The filtered output is then sampled during the first 2 msec window of the response telegram via S & H circuits 28, 30. The S & H circuits are gated via timing circuit 26. Finally, the sampled information is input to signal processor 34, which yields position data out.

One application of this system is in an automated dock where transponders are dropped into drilled holes in the concrete and carts carrying cargo can travel from one location to another via the grid of transponders developed in the concrete. If the transponder is not positioned exactly straight up and down or is cocked to one side or the other, the (0,0) coordinate reference may be skewed either one way or another. One way to alleviate this problem would be to determine the difference in the reference each offset made to each transponder and to generate a look-up table which would compensate for the offsets, and yield an accurate position.

A further embodiment of the invention is in detecting X, Y, and Z coordinates by placing a second antenna configuration, as shown in FIG. 3, lying parallel in another horizontal plane but approximately 5 inches beneath the original set of antennas. Detecting the two voltage measurements at the different heights and determining the difference between the measurements creates an exponent which through signal processing, can determine the height of the transponder as well.

A few preferred embodiments have been described in detail hereinabove. It is to be understood that the scope of the invention also comprehends embodiments different from those described, yet within the scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

I claim:

1. An antenna configuration for accurately determining the position of a transponder in an Radio-frequency Identification RF-ID system comprising:

a first and a second balanced receive antenna for receiving a fieldstrength voltage of a response telegram, whrein said response telegram comprises identification data, and has at least the same frequency as the interrogation signal wherein said first and second receive antennas are physically rotated 90 degrees relative to one another;

a transmitter antenna for transmitting a charge-up signal to said transponder wherein said transponder is charged to a maximum allowable voltage;

a first and a second receiver for narrow band fitting said receive fieldstrength voltages;

a first and a second sample and hold circuit for sampling said filtered signals for a first portion of said response telegram; and a processing circuit for generating a position coordinate relating to a position of said transponder from said sampled signals.

2. The antenna configuration of claim 1, wherein said narrow band filtering limited said receive fieldstrength voltages to a 600 MHz band centered around some predetermined center frequency.

3. The antenna configuration of claim 1, wherein said processing circuit logically "AND" said receive fieldstrength voltage signals to yield the coordinates of the transponder.

4. The antenna configuration of claim 1, wherein said processing circuit performs an analog to digital conversion on each received fieldstrength voltage signals to yield the coordinates of the transponder.

5. The antenna configuration of claim 1, further comprising:

a third receiver connected to said transmitter antenna for detecting the presence of a transponder;

a third sample and hold circuit for sampling said detection signal for a first portion of said detection signal; and wherein further, said processor also processes this third detection signal as a method of preventing a false zero measurement.

6. The antenna configuration of claim 1, wherein said transmitter antenna is disposed surrounding said receiver antennas.

7. The antenna configuration of claim 1, wherein at least one of said receiver antennas is comprised of two coils, having equal area.

8. The antenna configuration of claim 1, wherein the transponder telegram is realized as an induced fieldstrength voltage at said receiver antennas.

9. The antenna configuration of claim 1, wherein the induced fieldstrength voltages of each receiver antenna cancel each other out when the transponder is disposed substantially at the center of the antenna field pattern.

10. The antenna configuration of claim 9, wherein the point at which the induced fieldstrength voltages cancel each other out provides a reference for determining an absolute (X,Y) coordinate location.

11. The antenna configuration of claim 1, wherein only one of the receiver antenna signals is processed for determining the position coordinate of the transponder.

* * * * *